Aug. 14, 1934.     C. H. SMITH     1,969,912
METHOD FOR FORMING ARTICLES
Filed Jan. 15, 1932     3 Sheets-Sheet 1
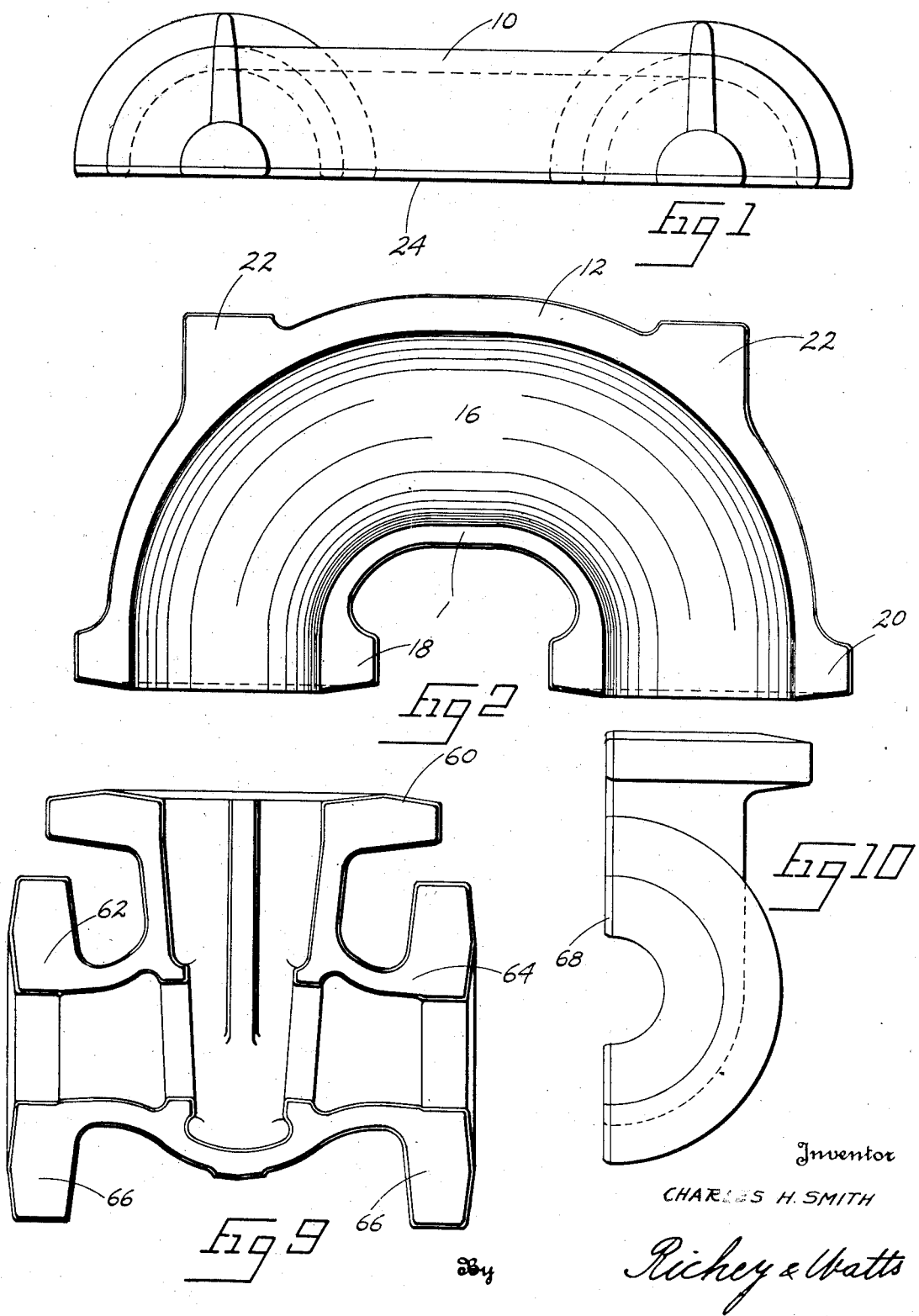
Inventor
CHARLES H. SMITH
By Richey & Watts
Attorneys Aug. 14, 1934.   C. H. SMITH   1,969,912
METHOD FOR FORMING ARTICLES
Filed Jan. 15, 1932   3 Sheets-Sheet 2
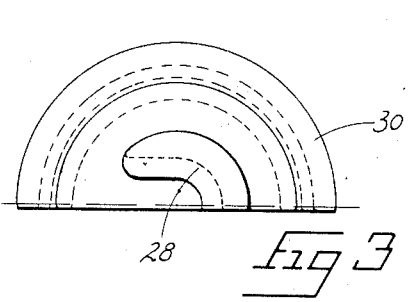
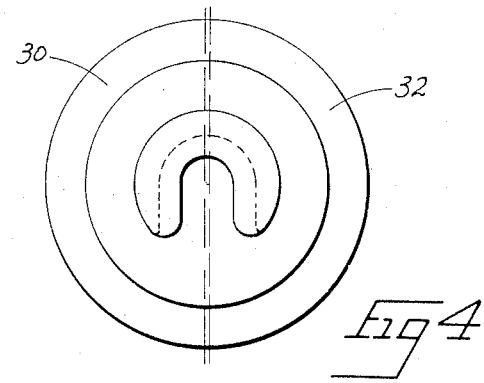
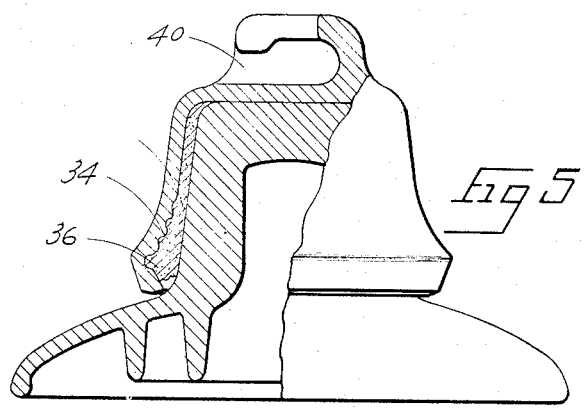
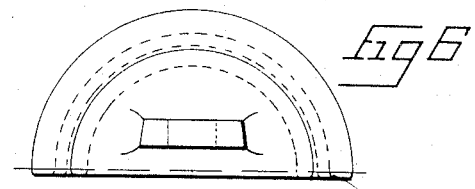
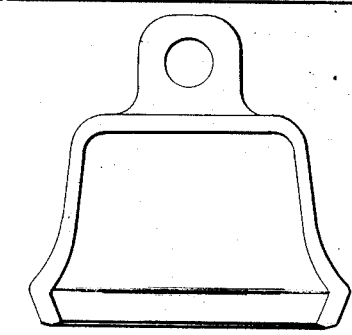
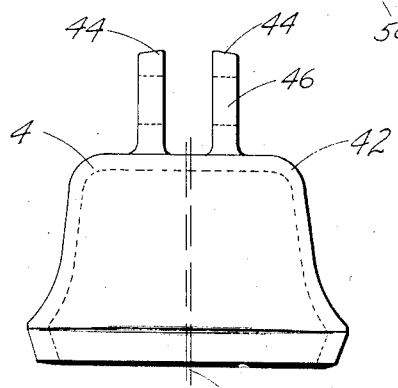
Inventor
CHARLES H. SMITH
By Richey & Watts
Attorneys Aug. 14, 1934.                  C. H. SMITH                    1,969,912
                        METHOD FOR FORMING ARTICLES
                        Filed Jan. 15, 1932        3 Sheets-Sheet 3

Inventor
CHARLES H. SMITH
By Richey & Watts
Attorneys

Patented Aug. 14, 1934

1,969,912

UNITED STATES PATENT OFFICE 1,969,912

METHOD FOR FORMING ARTICLES

Charles H. Smith, Cleveland, Ohio

Application January 15, 1932, Serial No. 586,747

4 Claims. (Cl. 219—10)

The present invention relates to forged articles and to a method of and an apparatus for forming the articles by forging the same in two or more separate parts and subsequently welding the forged parts together.

Metal articles such as valves, elbows, tube ends and the like which are of intricate shapes difficult to forge have heretofore been made of castings but have not been satisfactory under severe conditions such as where subjected to liquids under high pressure or at high temperatures or both. Castings are likely to be porous and of low tensile strength but are easy to make. Forgings are more dense and stronger than castings but articles such as those above named can not be forged as unitary structures. While they might be formed in separate parts and welded together, such articles have met with little or no commercial success, so far as I am aware, due I believe to the belief that the welds would constitute points of weakness because of the growth of the grains which takes place in such areas during welding.

The present invention makes available for severe uses articles such as those above named and in which the advantages of forged metal is combined with welded areas approximating in strength that of the areas remote from the welds.

Briefly stated the present invention includes the steps of forging parts of such articles, preferably complemental parts, and electrically welding the forged parts together. The welding is done while the parts are highly heated more or less uniformly thruout. If the parts are welded while still highly heated from the forging operation a considerable economy results as compared with cooling and then reheating the parts for welding.

By this invention I have been able to produce articles such as are above described cheaply and quickly and to obtain therein forged metallic structure which have substantially the same grain size and strength thruout the parent metal as well as in the weld areas and substantial freedom from zones of weakness which often characterize ferrous metals which are electrically welded at one place while other parts are comparatively cold.

In the accompanying drawings in which certain forms embodying the present invention are disclosed.

Figure 1 is a top plan view of a forged cracking still tube end section manufactured in accordance with the principles of the present invention.

Fig. 2 is a side view of the tube end section shown in Fig. 1.

Fig. 3 is a top plan view of one section of a suspension insulator cap of the ball and socket type manufactured in accordance with the principles of the present invention.

Fig. 4 is a top plan view of the completed suspension insulator cap.

Fig. 5 is a side elevation partly in section of the assembled porcelain suspension insulator.

Fig. 6 is a top plan view similar to Fig. 3 showing one section of a metal cap of the clevis type for a porcelain suspension insulator.

Fig. 7 is a side elevation of the insulator cap section shown in Fig. 6.

Fig. 8 is a side elevation of the assembled insulator cap shown in Fig. 7.

Fig. 9 is a side elevation of a forged valve casing section manufactured in accordance with the principles of the present invention.

Fig. 10 is an end view of the section shown in Fig. 9.

In all of the above described views like characters of reference are employed to designate like parts throughout.

Figure 11:
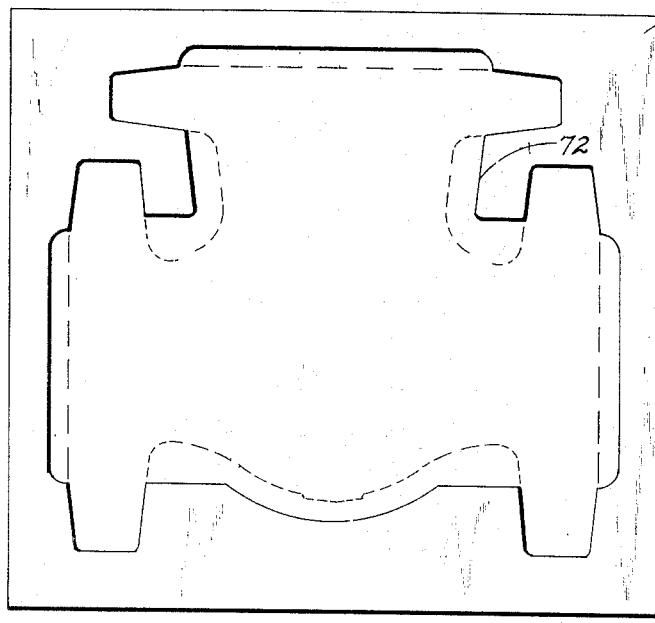
Fig. 11 is a plan view of a die employed in the manufacturing of the valve casing shown in Figures 9 and 10.

The invention is illustrated and described specifically in this specification in connection with the forming of tube ends for cracking stills, metal suspension caps for porcelain insulators and valves adapted for use in high pressure fluid lines. These articles have been selected for the purpose of description because certain advantages are obtained in manufacturing these articles by the improved process. It is to be understood however that the invention is not to be limited to the manufacture of these articles exclusively as the same is applicable to the manufacture of other articles. Wherever the advantages, that have already been outlined, and wherever other or similar advantages are obtained in the manufacture of other articles by the present process, the scope of the invention is to be extended.

Referring now to Figures 1 and 2, one of the forged sections of a cracking still tube end is shown. In manufacturing the tube ends two sections which are substantially identical in their size and shape are forged independently of each other. For this a single set of dies or plurality of dies are employed. The metal employed for the forgings may be of any suitable composition as for example stainless steel or any one of numerous special alloys. Irrespective, however, of the composition of the metal employed the essential features of the invention are attained.

The forging shown in Fig. 1 consists in a half section that is U-shaped. This section is designated at 10. The U-shaped edges 12 and 14 define therebetween a U-shaped semi-cylindrical depression 16. Flanges 18 and 20 respectively form an integral part of the casting at the ends thereof while reinforcing flanges may be provided at 22. Two sections are forged from the desired metal and while these sections are still hot from the forging operation they are placed in separate copper dies which may if desired be artificially cooled. While still in the dies the corresponding edges of the counter-part sections are brought together. Electrical current is caused to flow across the seam thus formed. The edges being brought to welding temperature, are forced together with the application of pressure that the two counter-part sections may be securely together to form a unitary welded article. Such flash as may occur on the inside and outside of the U-shaped edges formed by the groove 16 may then be trimmed off. It is contemplated welding the two sections together by direct resistance welding operation. If desired however, a flash weld may be effected by bringing the mating edges 12 and 14 of the sections 10 together to establish an electrical contact across the seam. The articles may then be slightly separated to permit arcing to occur across the seam to bring the edges up to welding temperature. When this has been accomplished the current flow may be stopped and the edes abutting against each other to create the weld. The flash may then be trimmed off and the article is completed.

In order to accommodate the weld and insure a properly formed article, the forged sections 10 are provided with a portion of excess metal shown at 24 at the mating edges. This metal is taken up in the welding operation so that the finished article is formed of the desired diameter.

The finished article consists in a hollow elbow shaped tube end having reinforcing ribs formed by the ribs 22 and continuous annular flanges formed by the mating flanges 18 and 20 of each section 10. Due to the inherently greater physical strength the tube ends which are manufactured by the above process are better able to withstand the extremely high pressures involved in cracking still operations. Such tube ends will resist acid corrosion and furthermore, due to the greater tensile strength of the metal employed, the tube ends may be made of thinner and consequently lighter material.

In the manufacture of porcelain suspension insulator caps the use of castings has met with as little success as in the formation of cracking still tube ends. These caps consist generally in a cup shape member in which the head or top of the porcelain insulator is inserted and cemented in position. Because of the relatively high coefficient of expansion of metal and because of the relatively low coefficient of expansion of porcelain and also because of the susceptibility of porcelain to fracture, it is desired that the cylindrical metal wall of the supporting cap be made as thin as possible. Where this wall is formed of relatively thick material the alternate expansion and contraction of the wall that comes with seasonal weather changes and with periodic rising and lowering of temperatures each twenty-four hour day causes a loosening of the porcelain insulator in the cap and sometimes under extremely adverse temperature conditions, causes rupture of the insulator.

Because of the lesser tensile strength of metal that has been cast, whether formed of ordinary steel or of stainless steel or alloys, as compared to forged metal, in order to satisfy the requirement for strength, the walls of the insulator caps must be formed of comparatively great thickness. Where the insulator caps are formed of one-piece forgings a wall that is considerably thinner and one which will satisfy the requirement for strength has been obtained. Such a wall, due to its thinness will not exert such a deleterious influence on the insulator which is supported within the same. Indeed so satisfactory has the use of drop forgings been found to be in actual practice that many consumers of these insulator caps have specified to their manufacturers that the insulator caps shall be supplied as drop forgings.

In order to retain the porcelain insulators in the socket provided by the insulator cap, the inner wall of the cap is ordinarily formed with a series of annular ridges which serve to retain the binding material or cement in the socket. Where one piece drop forgings are employed it is impossible to provide these ridges by the forging operation inasmuch as the male dies cannot be removed from the work. Accordingly the irregularities on the inner walls of the caps have been provided by a subsequent pressing operation. This subsequent pressing operation is obviously attended by an additional cost in the manufacture of the article.

The present invention contemplates the manufacture of metal porcelain suspension insulator caps by a two-piece forging operation wherein complementary sections of the insulator caps are separately forged and subsequently resistance welded together to form the unitary articles. By this method the additional expense of employing skilled labor for the forming operation above referred to is eliminated while at the same time the advantages that accrue from the use of forged metal are preserved.

Referring now to Figures 3, 4 and 5 the process of manufacturing metal caps for porcelain suspension insulators is shown. The caps are forged in two complemental sections 30 and 32. For this process separate sets of forging dies may be employed. The sections are united at their mating edges by means of a direct resistance weld or a flash weld as described in connection with the formation of cracking still tube ends. The completed article is shown in Fig. 5. In these figures a porcelain suspension insulator is shown associated with the metal cap formed by the forging and welding process. This cap consists in a cup-shaped member afforded by the sections 30 and 32 when welded together along their mating edges. The inner wall of the receptacle is provided with a series of annular ridges and depressions 34 which ridges and depressions serve to hold a filler material 36 in position. This material serves to securely hold the porcelain shank 30 in position within the cap. The cap is provided with an overlying U-shaped flange 38 forming a socket 40 for the reception of a ball type suspension member.

The insulator cap shown in Figs. 6, 7 and 8 is somewhat similar to that shown in Figures 3, 4 and 5. The cap shown is of the clevis type and is forged in two sections 41 and 42 each having outstanding lugs 44 provided with apertures 46 extending therethrough. The forged parts are united by a direct resistance or flash welding operation along their lines of juncture 48 thus forming the unitary structure shown in Fig. 8. When so united the lugs 44 are opposed and the apertures 46 extending therethrough are aligned to accommodate a supporting pin therethrough.

In both forms of the insulator disclosed a portion of excess metal shown at 50 is provided along the mating edges of the sections of the device, which excess metal is taken up and loses its identity during the welding operation. It is obvious then that by the present process insulator caps may be formed of comparatively thinner material than has been possible in the case of castings. By forming the walls of the caps of thinner material the subsequent alternate expansion and contraction of the wall will be greatly reduced. In addition to this the tensile strength of the wall, as compared to that of a thicker wall of cast material, will not be impaired.

Figure 12:
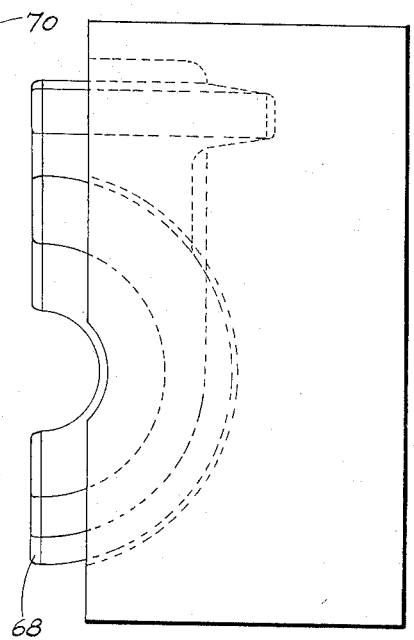
Fig. 12 is an end view of the die shown in Fig. 11 and showing one section of a valve casing mounted therein.
Figure 13:
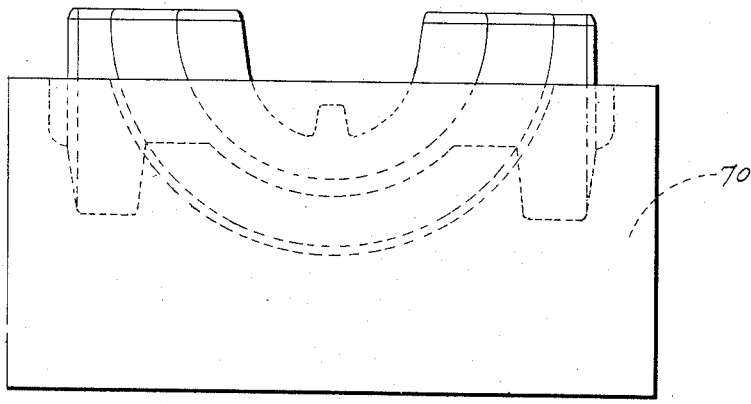
Fig. 13 is a side elevation of the die shown in Figures 1 and 2.

Referring now to Figures 9, 10, 11, 12 and 13 the method of manufacturing valve casings in accordance with the principles of the present invention is disclosed. Two sections of the casing, best shown in Figures 9 and 10 and designated at 60 are forged in a single set or in a plurality of sets of forging dies. The two sections of the casing are provided with mating edges 62, 64 and 66. These edges are provided with the required amount of excess material for the welding operation. In welding the sections 60 together the sections are placed in opposed copper dies one of which is shown at 70. These dies are formed with opposed depressions 72 which are complementary to the external surfaces of the sections 60. The dies may be formed of copper castings in which there may be embedded transverse or longitudinal pipes 72 adapted to have a cooling fluid circulated therethrough. The dies 70 comprise electrodes adapted to have applied thereto a welding current. As the dies are moved together so that the mating edges 62, 64 and 66 of the valve casing sections are brought together, current will flow from one electrode to the other across the seam thus formed. By proper operation of the dies 70 a direct resistance welding or flash welding operation is effected and the two sections 60 are united into a unitary integral structure. The completed casing may be removed from the dies 70 and the flash may be trimmed from the same in any suitable manner.

Valve casings which are formed in accordance with the above described process will be nonporous and will withstand high pressures and temperatures. Furthermore because of the physical properties of the forged metal involved lighter and thinner valve casings may be constructed.

What I claim is:

1. The method of making ferrous metal articles of intricate shape difficult to forge which includes the steps of forging parts of such an article, assembling the parts in welding dies and electrically welding the parts together to form the desired article while the parts are highly heated thruout to substantially uniform temperature.

2. The method of making ferrous metal articles of intricate shape difficult to forge which includes the steps of forging parts of such an article, assembling the parts in welding dies while still highly heated from the forging step, and electrically welding the highly heated parts together to form the desired article.

3. The method of making ferrous metal articles of intricate shape difficult to forge which includes the steps of forging complemental parts of such an article, assembling the parts in opposed relation in welding dies and electrically welding the parts together to form the desired article while the parts are highly heated thruout to substantially uniform temperature.

4. The method of making ferrous metal articles of intricate shape difficult to forge which includes the steps of forging complemental parts of such an article, assembling the parts in opposed relation in welding dies while still highly heated from the forging step, and electrically welding the highly heated parts together to form the desired article.

CHARLES H. SMITH.